United States Patent
Nishio

(10) Patent No.: US 12,149,124 B2
(45) Date of Patent: Nov. 19, 2024

(54) COMPRESSOR

(71) Applicant: FUJITSU GENERAL LIMITED, Kanagawa (JP)

(72) Inventor: Tomoki Nishio, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 595 days.

(21) Appl. No.: 16/979,027

(22) PCT Filed: Mar. 14, 2019

(86) PCT No.: PCT/JP2019/010693
§ 371 (c)(1),
(2) Date: Sep. 8, 2020

(87) PCT Pub. No.: WO2019/181754
PCT Pub. Date: Sep. 26, 2019

(65) Prior Publication Data
US 2021/0057945 A1 Feb. 25, 2021

(30) Foreign Application Priority Data
Mar. 22, 2018 (JP) .................................. 2018-054267

(51) Int. Cl.
*H02K 1/27* (2022.01)
*H02K 1/276* (2022.01)
(Continued)

(52) U.S. Cl.
CPC .............. *H02K 1/276* (2013.01); *H02K 1/32* (2013.01); *H02K 7/14* (2013.01)

(58) Field of Classification Search
CPC ........ H02K 1/276; H02K 1/2766; H02K 1/32; H02K 7/14
(Continued)

(56) References Cited

U.S. PATENT DOCUMENTS 8,659,195 B2 * 2/2014 Tanaka .................. F04C 23/008
  310/66
9,847,682 B2 * 12/2017 Takahashi ................ H02K 1/28
(Continued)

FOREIGN PATENT DOCUMENTS

| CN | 103973005 A | 8/2014 |
| CN | 105144548 A | 12/2015 |

(Continued)

OTHER PUBLICATIONS

International Search Report (ISR) dated May 28, 2019 filed in PCT/JP2019/010693.
(Continued)

*Primary Examiner* — Alex W Mok
(74) *Attorney, Agent, or Firm* — RANKIN, HILL & CLARK LLP

(57) ABSTRACT

A compressor includes a rotor that is fixed to a shaft, a stator that rotates the rotor about an axis of rotation, and a compressor part that compresses a refrigerant by the shaft rotating, wherein the rotor has a rotor core in which a refrigerant hole is formed, a first magnet that is embedded in the rotor core, and a second magnet that is embedded in the rotor core, an interior wall surface of the refrigerant hole includes a first portion that is formed on a side close to the first magnet, a second portion that is formed on a side close to the second magnet, and a magnet-side intermediate interior wall surface portion that is formed between the first portion and the second portion, and the magnet-side intermediate interior wall surface portion is closer to the axis of rotation than the first portion and the second portion.

5 Claims, 8 Drawing Sheets

(51) Int. Cl.
*H02K 1/32* (2006.01)
*H02K 7/14* (2006.01)

(58) Field of Classification Search
USPC .................................................. 310/156.01
See application file for complete search history.

(56) References Cited

U.S. PATENT DOCUMENTS

| | | |
|---|---|---|
| 9,866,082 B2 | 1/2018 | Cao et al. |
| 9,935,513 B2 | 4/2018 | Yokota et al. |
| 2010/0061868 A1 | 3/2010 | Kojima |
| 2014/0175916 A1* | 6/2014 | Chamberlin ............ H02K 9/19 |
| | | 310/54 |
| 2014/0203674 A1 | 7/2014 | Cao et al. |
| 2015/0137650 A1* | 5/2015 | Takahashi ............... H02K 1/32 |
| | | 310/156.56 |
| 2016/0006307 A1 | 1/2016 | Yokota et al. |
| 2018/0248426 A1 | 8/2018 | Nigo et al. |

FOREIGN PATENT DOCUMENTS

| | | |
|---|---|---|
| JP | 8-336250 A | 12/1996 |
| JP | 2002-345188 A | 11/2002 |
| JP | 2003-116235 A | 4/2003 |
| JP | 2007-104888 A | 4/2007 |
| JP | 2008-206358 A | 9/2008 |
| JP | 2016-144362 A | 8/2016 |
| JP | 2017-8949 A | 1/2017 |
| JP | 2017-41958 A | 2/2017 |
| JP | 2017-108516 A | 6/2017 |
| JP | 2017-184343 A | 10/2017 |
| WO | 2014/174579 A1 | 10/2014 |
| WO | 2017/072967 A1 | 5/2017 |

OTHER PUBLICATIONS

Chinese Office Action (CNOA) dated Aug. 24, 2022 for Chinese Patent Application No. 201980019393.1; English machine translation.

* cited by examiner

COMPRESSOR

FIELD

The present invention relates to a compressor.

BACKGROUND

Closed compressors have been known in which a compressor part and a motor part are stored in the interior of a closed container. The motor part includes a rotor in which permanent magnets are embedded and a stator that generates a revolving field so as to rotate the rotor, and transfers rotational power to the compressor part through a shaft fixed to the rotor. The compressor part uses the rotational power transferred from the motor so as to compress a refrigerant (see Patent Literatures 1 to 6).

CITATION LIST

Patent Literature

Patent Literature 1: Japanese Laid-open Patent Publication No. 2017-184343
Patent Literature 2: Japanese Laid-open Patent Publication No. 2008-206358
Patent Literature 3: Japanese Laid-open Patent Publication No. 2007-104888
Patent Literature 4: Japanese Laid-open Patent Publication No. 2002-345188
Patent Literature 5: Japanese Laid-open Patent Publication No. H08-336250
Patent Literature 6: International Publication No. WO 2014/174579

SUMMARY

Technical Problem

When the revolving field generated by the stator causes the rotor to rotate, for example, magnetic flux from the stator produces an eddy current in the permanent magnets embedded in the rotor, thereby heating the permanent magnets. Heat generation of the permanent magnets has the problem of adversely affecting the motor, such as causing the permanent magnets to be demagnetized.

The disclosed technology is achieved in view of the foregoing, and it is an object thereof to provide a compressor that cools permanent magnets provided to a motor part.

Solution to Problem

According to an aspect of the disclosure, a compressor includes a rotor that is fixed to a shaft, a stator that causes the rotor to rotate about an axis of rotation, a compressor part that compresses a refrigerant by the shaft rotating, and a container that forms an interior space in which the rotor, the stator, and the compressor part are stored, wherein the rotor has a rotor core in which a refrigerant hole is formed, a first magnet that is embedded in the rotor core, and a second magnet that is embedded in the rotor core, a magnet-side interior wall surface of an interior wall surface of the refrigerant hole that is formed on a side far from the axis of rotation includes a first magnet-side interior wall surface portion that is formed on a side close to the first magnet, a second magnet-side interior wall surface portion that is formed on a side close to the second magnet, and a magnet-side intermediate interior wall surface portion that is formed between the first magnet-side interior wall surface portion and the second magnet-side interior wall surface portion, and the magnet-side intermediate interior wall surface portion is formed on a side closer to the axis of rotation than the first magnet-side interior wall surface portion and the second magnet-side interior wall surface portion are.

Advantageous Effects of Invention

The compressor of the present disclosure is capable of cooling the permanent magnets provided to the motor part.

DESCRIPTION OF EMBODIMENTS

A compressor according to an embodiment disclosed herein will be described below with reference to the drawings. The following description does not intend to limit the technology of the present disclosure. In the following description, the same reference signs are given to the same components, and overlapping descriptions are omitted.

Figure 1:
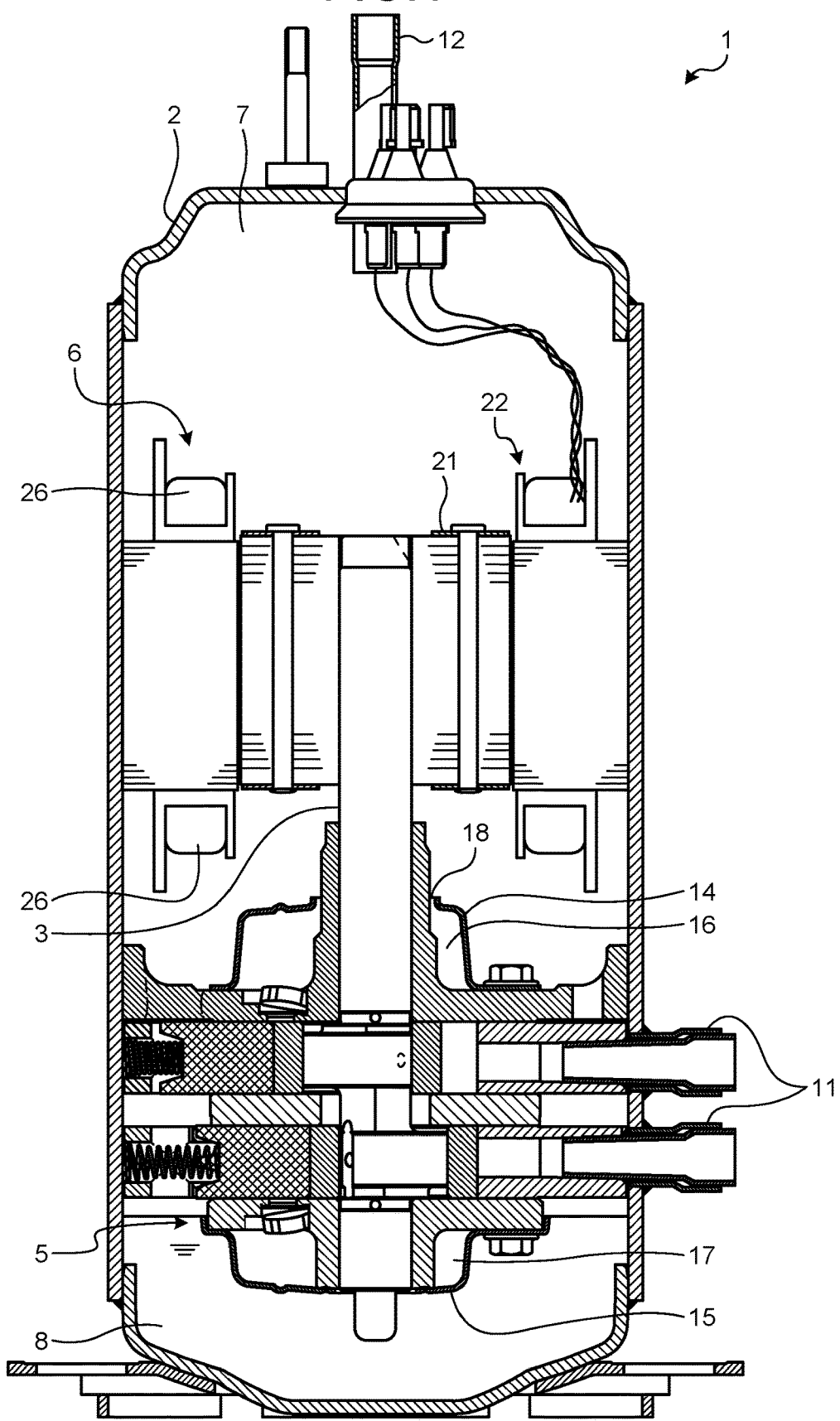
FIG. 1 is a vertical sectional view illustrating a compressor according to an embodiment.

FIG. 1 is a vertical sectional view illustrating a compressor according to the embodiment. The compressor 1 includes a container 2, a shaft 3, a compressor part 5, and a motor part 6, as illustrated in FIG. 1. The container 2 forms an enclosed interior space 7. The interior space 7 is formed into a substantially cylindrical column. The container 2 is formed in such a manner that the central axis of the cylindrical column of the interior space 7 is parallel to the vertical direction when the container 2 is mounted vertically on a level surface. The container 2 has an oil sump 8 formed in the lower part of the interior space 7. In the oil sump 8, refrigeration oil for lubricating the compressor part 5 is stored. Suction pipes 11 for sucking a refrigerant and a discharge pipe 12 for discharging a compressed refrigerant are connected to the container 2. The shaft 3 has a rod shape, and is disposed in the interior space 7 of the container 2 in such a manner that one end of the shaft 3 is disposed in the oil sump 8. The shaft 3 is supported by the container 2 so as to be rotatable about the axis of rotation parallel to the central axis of the cylindrical column formed by the interior space 7. The shaft 3 rotates, thereby rotating a roller located in the interior of the compressor part 5. The roller being rotated compresses a refrigerant. The shaft 3 rotating causes refrigeration oil stored in the oil sump 8 to pass through the interior of the shaft 3, which is not illustrated, and to be supplied to the compressor part 5.

The compressor part 5 is disposed in the lower part of the interior space 7 and is disposed above the oil sump 8. The compressor 1 further includes an upper muffler cover 14 and a lower muffler cover 15. The upper muffler cover 14 is disposed in the upper part of the compressor part 5 in the interior space 7. The upper muffler cover 14 has an upper muffler chamber 16 formed in the interior thereof. The lower muffler cover 15 is disposed in the lower part of the compressor part 5 in the interior space 7, and is disposed in the upper part of the oil sump 8. The lower muffler cover 15 has a lower muffler chamber 17 formed in the interior thereof. The lower muffler chamber 17 communicates with the upper muffler chamber 16 by means of a communicating path (not illustrated) formed in the compressor part 5. A compressed refrigerant discharge hole 18 is formed between the upper muffler cover 14 and the shaft 3, and the upper muffler chamber 16 communicates with the interior space 7 by means of the compressed refrigerant discharge hole 18.

The compressor part 5 is what is called a rotary compressor, compresses a refrigerant supplied from the suction pipes 11 by the shaft 3 rotating, and supplies the compressed refrigerant to the upper muffler chamber 16 and the lower muffler chamber 17. The refrigerant has compatibility with refrigeration oil. The motor part 6 is disposed above the compressor part 5 in the interior space 7. The motor part 6 includes a rotor 21 and a stator 22. The rotor 21 is fixed to the shaft 3. The stator 22 is formed into a substantially cylindrical shape, is provided so as to surround the rotor 21, and is fixed to the container 2. The stator 22 includes winding 26. A single-phase or three-phase voltage is properly applied to the winding 26, whereby the stator 22 generates a revolving field so as to rotate the rotor 21.

Rotor 21

Figure 2:
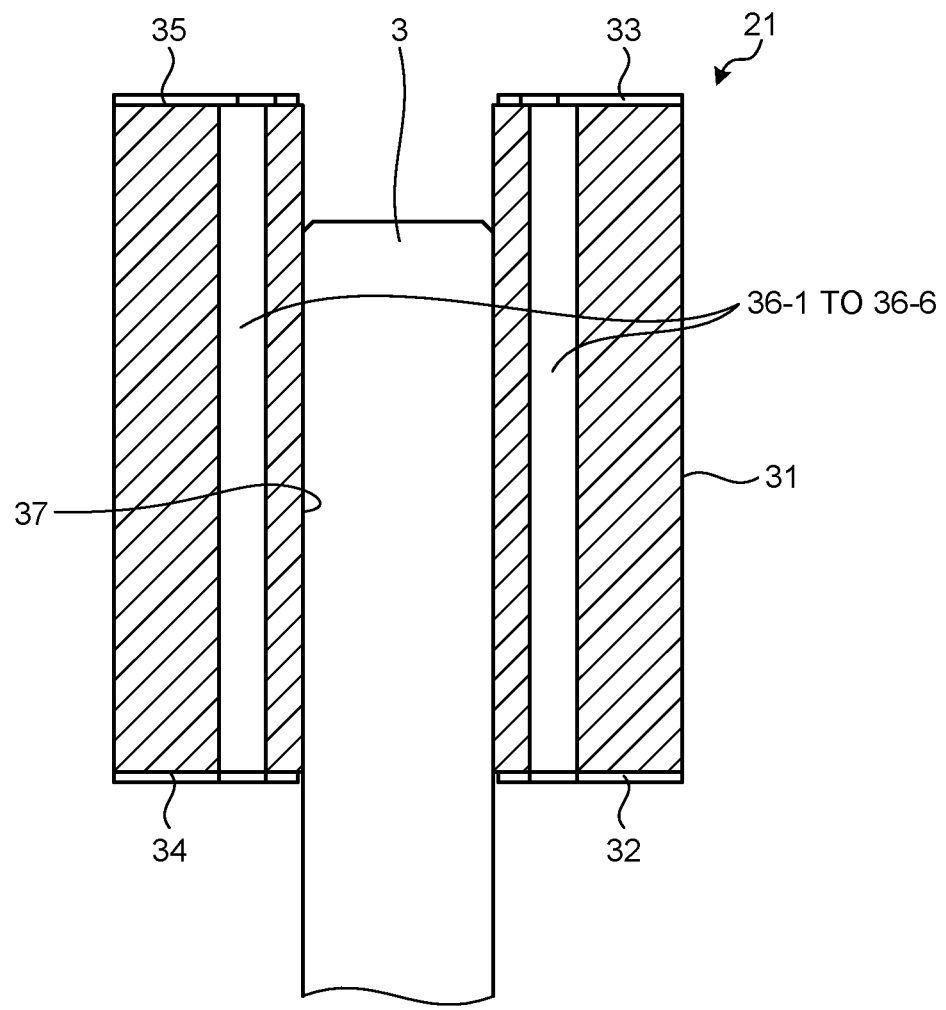
FIG. 2 is a sectional view illustrating a rotor of the compressor according to the embodiment.

FIG. 2 is a sectional view illustrating the rotor 21 of the compressor 1 according to the embodiment. The rotor 21 includes a rotor core 31, an underside rotor end plate 32, and an upper side rotor end plate 33, as illustrated in FIG. 2. The rotor core 31 is formed into a substantially cylindrical column, and is formed by laminating a plurality of steel sheets formed of a soft magnetic material such as a silicon steel sheet, for example. The rotor core 31 has an underside rotor end face 34 and an upper side rotor end face 35 formed thereon. The underside rotor end face 34 is formed at a site corresponding to one bottom of the cylindrical column formed by the rotor core 31, and is formed at a site of the rotor core 31 facing the compressor part 5. The upper side rotor end face 35 is formed at a site corresponding to the other bottom of the cylindrical column formed by the rotor core 31, and is formed on a side of the rotor core 31 opposite to the side on which the underside rotor end face 34 is formed.

The rotor core 31 further has a rotor shaft hole 37 and a plurality of refrigerant holes 36-1 to 36-6 formed therein. The rotor shaft hole 37 is formed so as to coincide with the central axis of the cylindrical column formed by the rotor core 31, and is formed so as to pass through the underside rotor end face 34 and the upper side rotor end face 35. The rotor core 31 is fixed to the shaft 3 with the shaft 3 passing through the rotor shaft hole 37. The refrigerant holes 36-1 to 36-6 are formed so as to be parallel to the central axis of the rotor core 31, and is formed so as to pass through the underside rotor end face 34 and the upper side rotor end face 35.

The underside rotor end plate 32 is formed into a substantially discoid shape. The underside rotor end plate 32 adheres closely to the underside rotor end face 34 so as to cover the underside rotor end face 34 of the rotor core 31, and is fixed to the rotor core 31. The underside rotor end plate 32 exposes, to the interior space 7, respective ends of the refrigerant holes 36-1 to 36-6 on the underside rotor end face 34 side so that the refrigerant holes 36-1 to 36-6 communicate with the interior space 7. The upper side rotor end plate 33 is formed into a substantially discoid shape. The upper side rotor end plate 33 adheres closely to the upper side rotor end face 35 so as to cover the upper side rotor end face 35 of the rotor core 31, and is fixed to the rotor core 31. The upper side rotor end plate 33 exposes, to the interior space 7, respective ends of the refrigerant holes 36-1 to 36-6 on the upper side rotor end face 35 side so that the refrigerant holes 36-1 to 36-6 communicate with the interior space 7.

Figure 3:
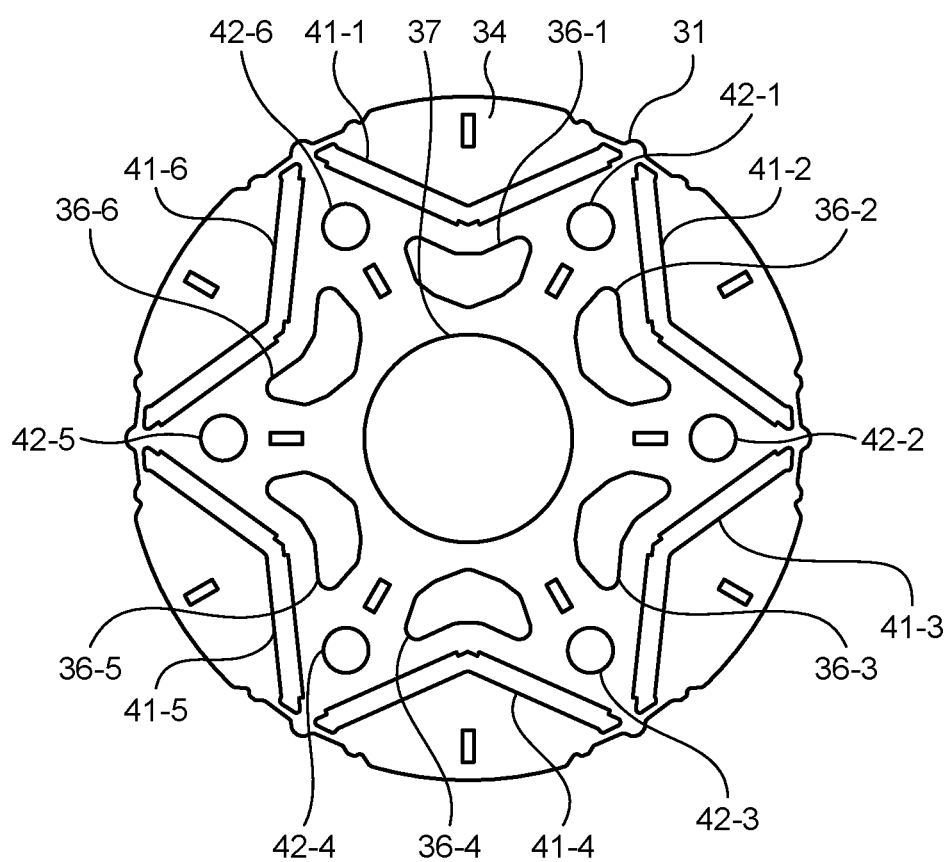
FIG. 3 is a plan view illustrating a rotor core of the compressor according to the embodiment.

FIG. 3 is a plan view illustrating the rotor core 31 of the compressor 1 according to the embodiment. The refrigerant holes 36-1 to 36-6 are spaced at regular intervals around the rotor shaft hole 37, as illustrated in FIG. 3. The rotor core 31 further has a plurality of magnet holes 41-1 to 41-6 and a plurality of rivet holes 42-1 to 42-6 formed therein. The magnet holes 41-1 to 41-6 are each formed on the outside diameter side, which is farther from the rotor shaft hole 37 than the refrigerant holes 36-1 to 36-6 are. In other words, a first magnet hole 41-1 out of the magnet holes 41-1 to 41-6 is formed on the outside diameter side of a first refrigerant hole 36-1 of the refrigerant holes 36-1 to 36-6. A second magnet hole 41-2 out of the magnet holes 41-1 to 41-6 is formed on the outside diameter side of a second refrigerant hole 36-2 of the refrigerant holes 36-1 to 36-6. A third magnet hole 41-3 out of the magnet holes 41-1 to 41-6 is formed on the outside diameter side of a third refrigerant hole 36-3 of the refrigerant holes 36-1 to 36-6. A fourth magnet hole 41-4 out of the magnet holes 41-1 to 41-6 is formed on the outside diameter side of a fourth refrigerant hole 36-4 of the refrigerant holes 36-1 to 36-6. A fifth magnet hole 41-5 out of the magnet holes 41-1 to 41-6 is formed on the outside diameter side of a fifth refrigerant hole 36-5 of the refrigerant holes 36-1 to 36-6. A sixth magnet hole 41-6 out of the magnet holes 41-1 to 41-6 is formed on the outside diameter side of a sixth refrigerant hole 36-6 of the refrigerant holes 36-1 to 36-6.

The rivet holes 42-1 to 42-6 are formed on the outside diameter side, which is farther from the rotor shaft hole 37 than the refrigerant holes 36-1 to 36-6 are, and are formed on the inside diameter side, which is closer to the rotor shaft hole 37 than the magnet holes 41-1 to 41-6 are. The rivet holes 42-1 to 42-6 are formed on the outside diameter side in regions adjacent to the refrigerant holes 36-1 to 36-6 in the circumferential direction so that the positions of the rivet holes 42-1 to 42-6 in the circumferential direction do not overlap the respective positions of the refrigerant holes 36-1 to 36-6 in the circumferential direction.

Figure 4:
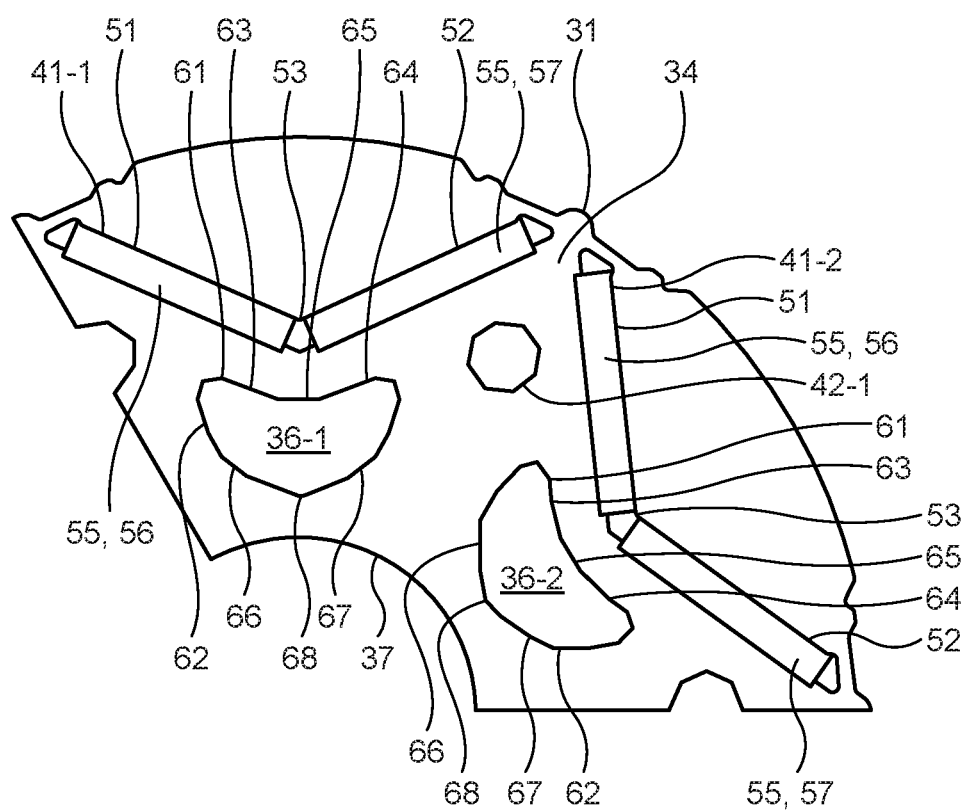
FIG. 4 is an enlarged plan view illustrating the rotor of the compressor according to the embodiment.

FIG. 4 is an enlarged plan view illustrating the rotor core 31 of the compressor 1 according to the embodiment. As illustrated in FIG. 4, the first magnet hole 41-1 is formed into a V shape, and is formed to follow the curved surface so as to be convex toward the inside diameter side. In other words, the first magnet hole 41-1 includes a first magnet hole portion 51, a second magnet hole portion 52, and an intermediate hole portion 53. The first magnet hole portion 51 and the second magnet hole portion 52 are connected to each other through the intermediate hole portion 53. One end of the first magnet hole portion 51 on the side close to the second magnet hole portion 52 is disposed on the inside diameter side, which is closer to the axis of rotation of the rotor shaft hole 37, than the other end of the first magnet hole portion 51 on the side farther from the second magnet hole portion 52 is. One end of the second magnet hole portion 52 on the side close to the first magnet hole portion 51 is disposed on the inside diameter side than the other end of the second magnet hole portion 52 on the side farther from the first magnet hole portion 51 is.

Out of the magnet holes 41-1 to 41-6, magnet holes other than the first magnet hole 41-1 are also formed into a V shape, and are formed to follow the curved surface so as to be convex toward the inside diameter side, similarly to the first magnet hole 41-1.

The rotor 21 further includes a plurality of permanent magnets 55. The permanent magnets 55 are each formed into a plate-like shape. One each of the permanent magnets 55 is embedded in the first magnet hole portion 51 and the second magnet hole portion 52 of each of the magnet holes 41-1 to 41-6. In other words, two each of the permanent magnets 55 are embedded in each of the magnet holes 41-1 to 41-6. One end of a first magnet 56 on the side closer to a second magnet 57 is disposed on the inside diameter side than the other end of the first magnet 56 on the side farther from the second magnet 57 is. One end of the second magnet 57 on the side closer to the first magnet 56 is disposed on the inside diameter side than the other end of the second magnet 57 on the side farther from the first magnet 56 is.

The underside rotor end plate 32 and the upper side rotor end plate 33 are properly attached to the rotor core 31, whereby both ends of the magnet holes 41-1 to 41-6 are blocked. Both ends of the magnet holes 41-1 to 41-6 are blocked by the underside rotor end plate 32 and the upper side rotor end plate 33, whereby the permanent magnets 55 are fixed to the rotor core 31 so as not to fall off the rotor core 31. The permanent magnets 55 are embedded in the magnet holes 41-1 to 41-6 each formed into a V shape, so that the permanent magnets 55 having a larger surface area can also be disposed in the interior of the rotor 21 and the rotor 21 can ensure a large magnetic force.

A first refrigerant hole 36-1 has a magnet-side interior wall surface 61 and a rotor-shaft-hole-side interior wall surface 62 formed thereon. The magnet-side interior wall surface 61 forms a portion of the interior wall surface of the first refrigerant hole 36-1 that is disposed on the outside diameter side, and forms a portion of the interior wall surface of the first refrigerant hole 36-1 that is disposed on the side closer to the first magnet hole 41-1.

The magnet-side interior wall surface 61 is formed to follow the curved surface so as to be convex toward the inside diameter side. In other words, the magnet-side interior wall surface 61 includes a first magnet-side interior wall surface portion 63, a second magnet-side interior wall surface portion 64, and a magnet-side intermediate interior wall surface portion 65. The magnet-side intermediate interior wall surface portion 65 is formed between the first magnet-side interior wall surface portion 63 and the second magnet-side interior wall surface portion 64, and the first magnet-side interior wall surface portion 63 and the second magnet-side interior wall surface portion 64 are connected to each other through the magnet-side intermediate interior wall surface portion 65. The first magnet-side interior wall surface portion 63 is formed so as to roughly follow one plane parallel to the other plane that the first magnet hole portion 51 of the first magnet hole 41-1 follows. The second magnet-side interior wall surface portion 64 is formed so as to roughly follow one plane parallel to the other plane that the second magnet hole portion 52 of the first magnet hole 41-1 follows.

The rotor-shaft-hole-side interior wall surface 62 is formed to follow the curved surface so as to be convex toward the inside diameter side, and the center thereof projects toward the rotor shaft hole 37. In other words, the rotor-shaft-hole-side interior wall surface 62 includes a first rotor-shaft-hole-side interior wall surface portion 66, a second rotor-shaft-hole-side interior wall surface portion 67, and a rotor-shaft-hole-side intermediate interior wall surface portion 68. The rotor-shaft-hole-side intermediate interior wall surface portion 68 is formed between the first rotor-shaft-hole-side interior wall surface portion 66 and the second rotor-shaft-hole-side interior wall surface portion 67, and the first rotor-shaft-hole-side interior wall surface portion 66 and the second rotor-shaft-hole-side interior wall surface portion 67 are connected to each other through the rotor-shaft-hole-side intermediate interior wall surface portion 68. The first rotor-shaft-hole-side interior wall surface portion 66 is provided closer to the outside diameter side than the rotor-shaft-hole-side intermediate interior wall surface portion 68 is, and the end of the first rotor-shaft-hole-side interior wall surface portion 66 on the side opposite to the side adjacent to the rotor-shaft-hole-side intermediate interior wall surface portion 68 is adjacent to the first magnet-side interior wall surface portion 63. The second rotor-shaft-hole-side interior wall surface portion 67 is provided closer to the outside diameter side than the rotor-shaft-hole-side intermediate interior wall surface portion 68 is, and the end of the second rotor-shaft-hole-side interior wall surface portion 67 on the side opposite to the side adjacent to the rotor-shaft-hole-side intermediate interior wall surface portion 68 is adjacent to the second magnet-side interior wall surface portion 64.

Out of the refrigerant holes 36-1 to 36-6, refrigerant holes other than the first refrigerant hole 36-1 each have the magnet-side interior wall surface 61 and the rotor-shaft-hole-side interior wall surface 62 formed thereon, similarly to the first refrigerant hole 36-1.

Operation of the Compressor 1

The compressor 1 is installed in refrigeration cycle equipment, which is not illustrated, and is used to compress a refrigerant and circulate the refrigerant through the refrigeration cycle equipment. A three-phase voltage is applied to the winding 26 of the stator 22, whereby the motor part 6 of the compressor 1 generates a revolving field. The revolving field generated by the stator 22 causes the rotor 21 to rotate. When the revolving field generated by the stator 22 causes the rotor 21 to rotate, the permanent magnets 55 embedded in the rotor 21 generate heat. The rotor 21 is rotated, whereby the motor part 6 causes the shaft 3 to rotate.

When the shaft 3 is rotated, the compressor part 5 sucks low-pressure refrigerant gas through the suction pipes 11, compresses the sucked low-pressure refrigerant gas, thereby generating high-pressure refrigerant gas, and supplies the high-pressure refrigerant gas to the upper muffler chamber 16 and the lower muffler chamber 17. The lower muffler cover 15 reduces the pressure pulsation of the high-pressure refrigerant gas that has been supplied to the lower muffler chamber 17, and supplies the high-pressure refrigerant gas the pressure pulsation of which has been reduced, to the upper muffler chamber 16. The upper muffler cover 14 reduces the pressure pulsation of the high-pressure refrigerant gas that has been supplied to the upper muffler chamber 16, and supplies the high-pressure refrigerant gas the pressure pulsation of which has been reduced, to a space between the compressor part 5 and the motor part 6 in the interior space 7 through the compressed refrigerant discharge hole 18. The high-pressure refrigerant gas that has been supplied to the space between the compressor part 5 and the motor part 6 in the interior space 7 has a lower temperature than that of the permanent magnets 55 when the rotor 21 is being rotated.

The high-pressure refrigerant gas that has been supplied to the space between the compressor part 5 and the motor part 6 in the interior space 7 passes through the refrigerant holes 36-1 to 36-6, thereby being supplied to a space above the motor part 6 in the interior space 7. The permanent magnets 55 are cooled by the high-pressure refrigerant gas passing through the refrigerant holes 36-1 to 36-6. In the compressor 1, the distances between the refrigerant holes 36-1 to 36-6 and the magnet holes 41-1 to 41-6 are short, so that the high-pressure refrigerant gas passing through the refrigerant holes 36-1 to 36-6 can cool the permanent magnets 55. The refrigerant that has been supplied to the space above the motor part 6 in the interior space 7 is discharged through the discharge pipe 12 to a device subsequent to the compressor 1 in the refrigeration cycle equipment.

Figure 5:
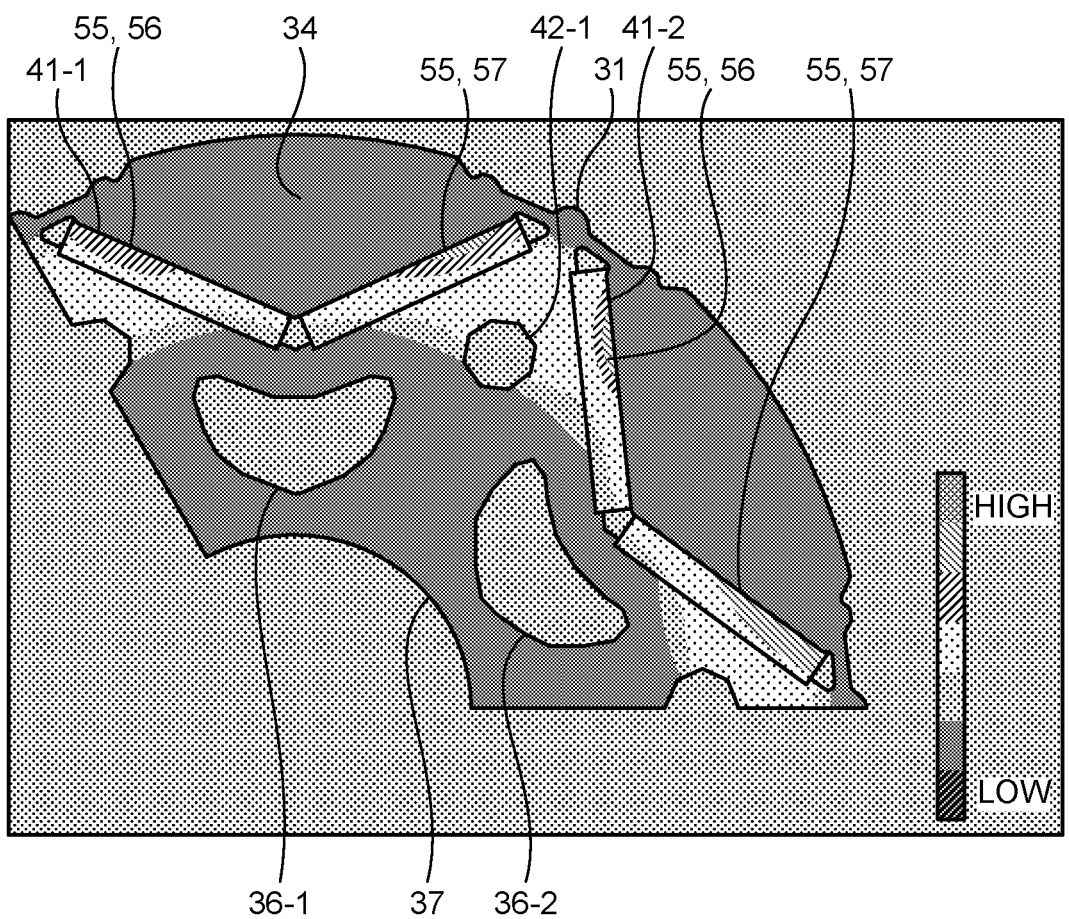
FIG. 5 is a view illustrating temperature distribution of the rotor core of the compressor according to the embodiment.

FIG. 5 is a view illustrating temperature distribution of the rotor core 31 of the compressor 1 according to the embodiment. FIG. 5 illustrates the temperature distribution of the rotor core 31 when the compressor 1 according to the embodiment is operated under rated cooling conditions.

Figure 6:
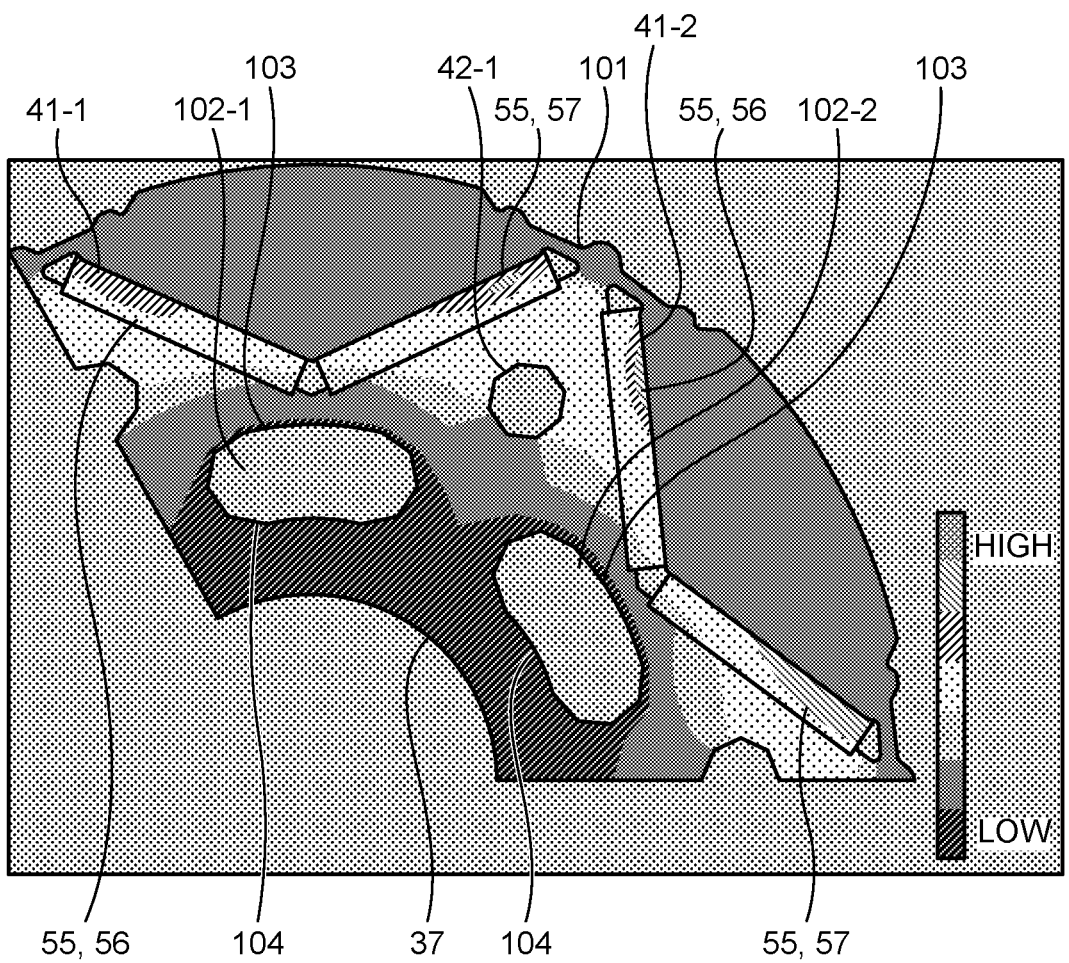
FIG. 6 is a view illustrating temperature distribution of a rotor core of a compressor according to a comparative example.

FIG. 6 is a view illustrating temperature distribution of a rotor core 101 of a compressor according to a comparative example. In the rotor core 101 of the compressor according to the comparative example, the refrigerant holes 36-1 in 36-6 of the rotor core 31 of the compressor 1 according to the embodiment previously described are replaced with a plurality of other refrigerant holes 102-1 to 102-6, as illustrated in FIG. 6. Out of the refrigerant holes 102-1 to 102-6, a first refrigerant hole 102-1 disposed on the inside diameter side of the first magnet hole 41-1 has a magnet-side interior wall surface 103 and a rotor-shaft-hole-side interior wall surface 104 formed thereon. The magnet-side interior wall surface 103 is formed to follow the curved surface so as to be convex toward the outside diameter side. The rotor-shaft-hole-side interior wall surface 104 is formed to follow the curved surface so as to be convex toward the outside diameter side. Out of the refrigerant holes 102-1 to 102-6, other refrigerant holes different from the first refrigerant hole 102-1 each have, formed thereon, the magnet-side interior wall surface 103 following the curved surface that is convex toward the outside diameter side and the rotor-shaft-hole-side interior wall surface 104 following the curved surface that is convex toward the outside diameter side, similarly to the first refrigerant hole 102-1.

FIG. 6 illustrates the temperature distribution of the rotor core 101 when the compressor according to the comparative example is operated under the same conditions as those under which the compressor 1 according to the embodiment is operated when the temperature distribution in FIG. 5 has been measured. The temperature distribution in FIG. 5 is now compared with the temperature distribution in FIG. 6. The temperature distribution in FIG. 5 reveals that the temperature on the intermediate hole portion 53 side between the first magnet 56 and the second magnet 57 decreases. This is because both the first magnet-side interior wall surface portion 63 and the second magnet-side interior wall surface portion 64 are formed on the side close to the first magnet 56 and the second magnet 57. The maximum value (107.8 (° C.)) of the temperature of the permanent magnets 55 according to the embodiment is lower than the maximum value (108.5 (° C.)) in the comparative example. In other words, FIG. 5 and FIG. 6 show that the compressor 1 according to the embodiment is capable of cooling the permanent magnets 55, as compared with the compressor according to the comparative example. The compressor 1 according to the embodiment is capable of reducing an adverse impact of heat generation of the permanent magnets 55 on the motor part 6, by efficiently cooling the permanent magnets 55.

The rotor core 31 is fixed to the shaft 3 by the shaft 3 passing through the rotor shaft hole 37 and the shaft 3 shrink-fitted thereto. For this reason, stress is applied to the region between the refrigerant holes 36-1 to 36-6 and the rotor shaft hole 37 in the rotor core 31.

Figure 7:
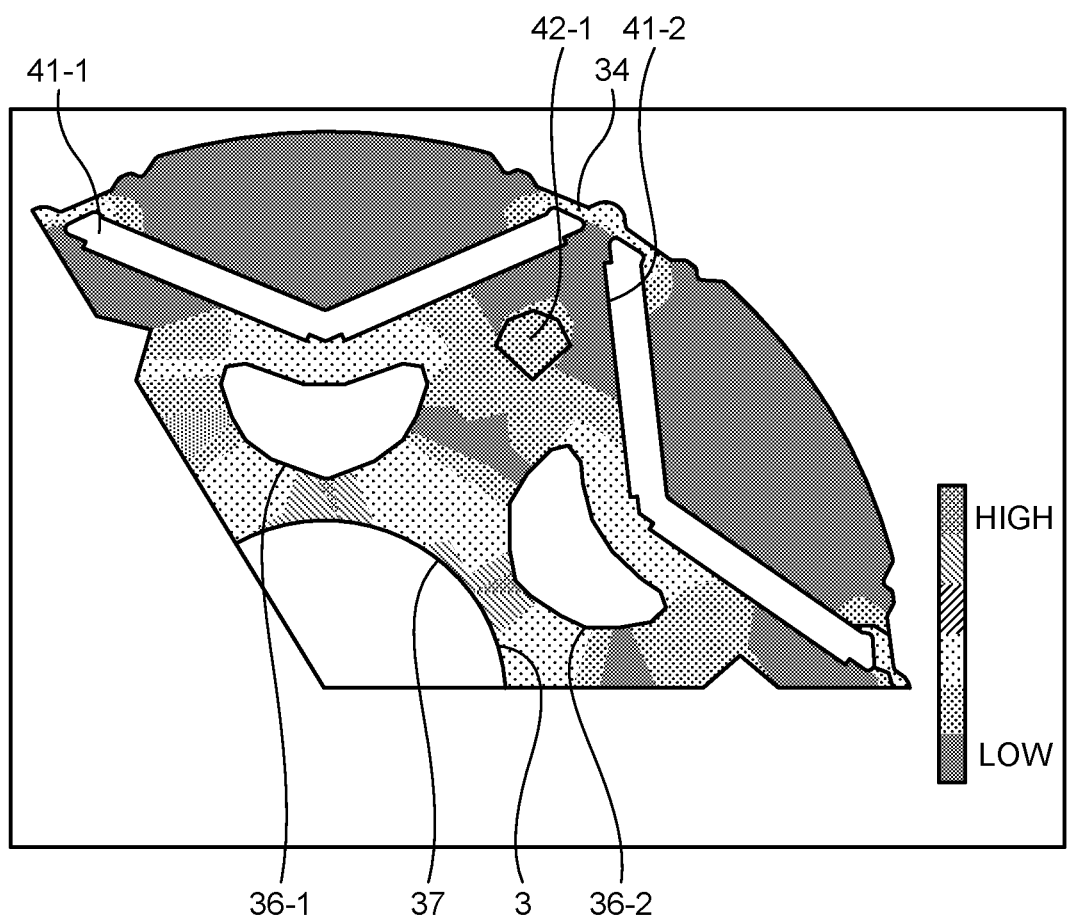
FIG. 7 is a plan view illustrating stress distribution of the rotor core of the compressor according to the embodiment.
Figure 8:
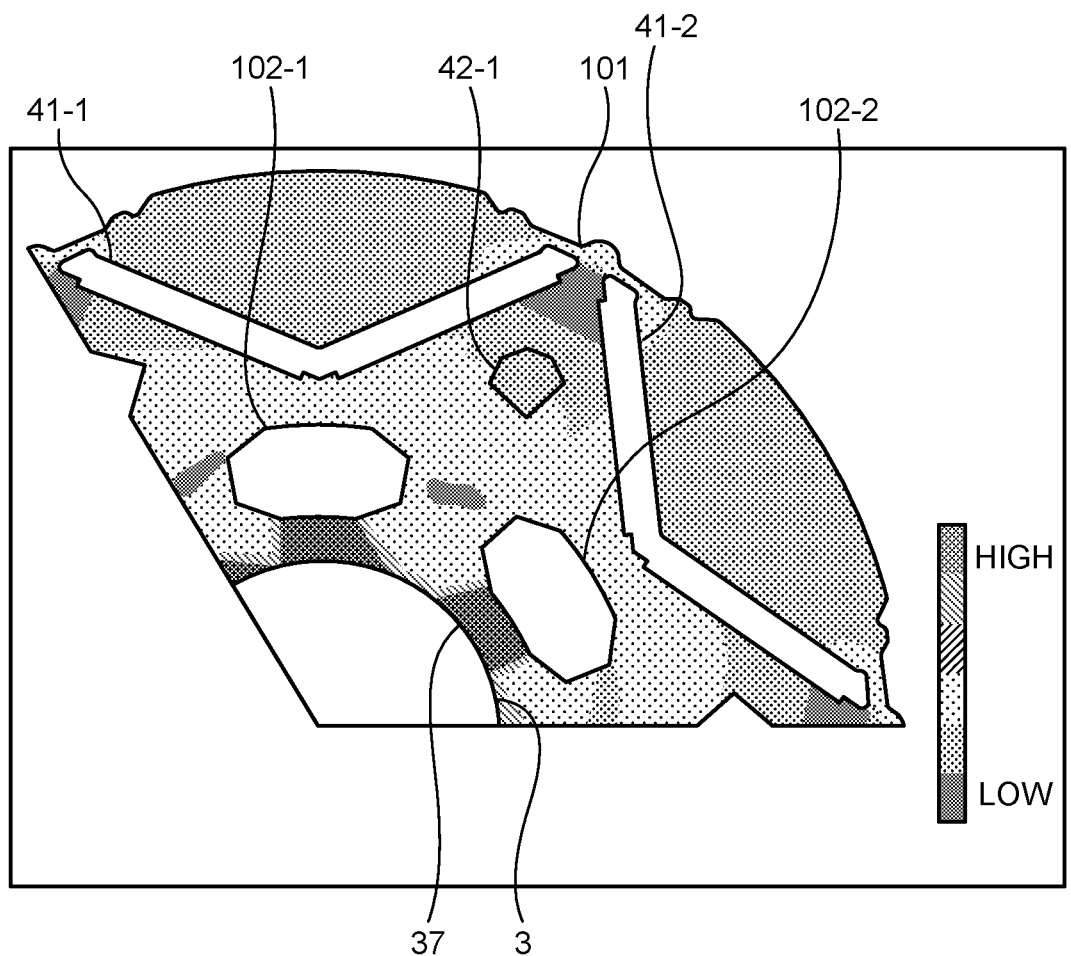
FIG. 8 is a view illustrating stress distribution of the rotor core of the compressor according to the comparative example.

FIG. 7 is a plan view illustrating stress distribution of the rotor core 31 of the compressor 1 according to the embodiment. FIG. 7 illustrates that the region in the rotor core 31 to which great stress is applied by shrink fit of the shaft 3 is relatively small. FIG. 8 is a view illustrating stress distribution of the rotor core 101 of the compressor according to the comparative example. The rotor core 101 of the compressor according to the comparative example is fixed to the shaft 3 by shrink fit, similarly to the rotor core 31 of the compressor 1 according to the embodiment. FIG. 8 illustrates that the region in the rotor core 101 to which great stress is applied by shrink fit of the shaft 3 is more widespread than the region in the rotor core 31 in FIG. 7 to which great stress is applied by shrink fit of the shaft 3. In other words, FIG. 7 and FIG. 8 show that the compressor 1 according to the embodiment is capable of reducing concentration of stress (stress concentration) applied to the rotor core 31 by shrink fit of the shaft 3, as compared with the compressor according to the comparative example. This is because the rotor-shaft-hole-side interior wall surface 62 of the compressor 1 according to the embodiment is formed to follow the curved surface so as to be convex toward the inside diameter side. In other words, in the compressor 1 according to the embodiment, the region between the refrigerant holes 36-1 to 36-6 and the rotor shaft hole 37 is larger in the radial direction than in the comparative example, which increases the strength of the rotor core 31 according to the embodiment. Although stress concentration tends to occur in areas where the strength is low and the shape changes, the rotor core 31 according to the embodiment has a higher strength than that in the comparative example, and is thus considered less prone to stress concentration than the comparative example.

Effect of the Compressor 1 According to the Embodiment

The compressor 1 according to the embodiment includes the rotor 21, the stator 22, the compressor part 5, and the container 2. The rotor 21 is fixed to the shaft 3. The stator 22 causes the rotor 21 to rotate about the axis of rotation. The compressor part 5 compress a refrigerant by the shaft 3 rotating. The container 2 forms the interior space 7 in which the rotor 21, the stator 22, and the compressor part 5 are stored. The rotor 21 includes the rotor core 31 in which the first refrigerant hole 36-1 is formed, the first magnet 56 embedded in the rotor core 31, and the second magnet 57 embedded in the rotor core 31. The magnet-side interior wall surface 61 of the interior wall surface of the first refrigerant hole 36-1 formed on the outside diameter side that is far from the axis of rotation of the shaft 3 includes the first magnet-side interior wall surface portion 63, the second magnet-side interior wall surface portion 64, and the magnet-side intermediate interior wall surface portion 65. The first magnet-side interior wall surface portion 63 is formed on the side close to the first magnet 56. The second magnet-side interior wall surface portion 64 is formed on the side close to the second magnet 57. The magnet-side intermediate interior wall surface portion 65 is formed between the first magnet-side interior wall surface portion 63 and the second magnet-side interior wall surface portion 64. The magnet-side intermediate interior wall surface portion 65 is formed on the inside diameter side, which is closer to the axis of rotation of the shaft 3 than the first magnet-side interior wall surface portion 63 and the second magnet-side interior wall surface portion 64 are. In the compressor 1 according to the embodiment, the distances between the refrigerant holes 36-1 to 36-6 and the permanent magnets 55 are short, and the refrigerant passing through the refrigerant holes 36-1 to 36-6 can cool the permanent magnets 55 provided in the rotor 21.

The first magnet 56 of the compressor 1 according to the embodiment is provided in such a manner that one end thereof on the side closer to the second magnet 57 is closer to the axis of rotation of the shaft 3 than the other end is, and the second magnet 57 is provided in such a manner that one end thereof on the side close to the first magnet 56 is closer to the axis of rotation of the shaft 3 than the other end is. In the compressor 1 according to the embodiment, when the first magnet 56 and the second magnet 57 of the permanent magnets 55 are arranged in a V shape, the refrigerant passing through the first refrigerant hole 36-1 can cool the first magnet 56 and the second magnet 57 more.

The first magnet-side interior wall surface portion 63 of the compressor 1 according to the embodiment follows one plane parallel to the other plane that the first magnet 56 follows, and the second magnet-side interior wall surface portion 64 follows one plane parallel to the other plane that the second magnet 57 follows. In the compressor 1 according to the embodiment, when the first magnet-side interior wall surface portion 63 and the second magnet-side interior wall surface portion 64 respectively follow the first magnet 56 and the second magnet 57, the refrigerant passing through the first refrigerant hole 36-1 can cool the first magnet 56 and the second magnet 57 more.

The rotor core 31 of the compressor 1 according to the embodiment has, further formed therein, the rotor shaft hole 37 through which the shaft 3 passes. The rotor-shaft-hole-side interior wall surface 62 of the interior wall surface of the first refrigerant hole 36-1 formed on the inside diameter side that is close to the axis of rotation of the shaft 3 includes the first rotor-shaft-hole-side interior wall surface portion 66, the second rotor-shaft-hole-side interior wall surface portion 67, and the rotor-shaft-hole-side intermediate interior wall surface portion 68. The rotor-shaft-hole-side intermediate interior wall surface portion 68 is formed between the first rotor-shaft-hole-side interior wall surface portion 66 and the second rotor-shaft-hole-side interior wall surface portion 67. The first rotor-shaft-hole-side interior wall surface portion 66 is adjacent to the first magnet-side interior wall surface portion 63. The second rotor-shaft-hole-side interior wall surface portion 67 is adjacent to the second magnet-side interior wall surface portion 64. The rotor-shaft-hole-side intermediate interior wall surface portion 68 is formed on the inside diameter side, which is closer to the rotor shaft hole 37 than the first rotor-shaft-hole-side interior wall surface portion 66 and the second rotor-shaft-hole-side interior wall surface portion 67 are. In the compressor 1 according to the embodiment, the region between the refrigerant holes 36-1 to 36-6 and the rotor shaft hole 37 increases in the radial direction, so that, without decreasing the strength of the rotor core 31, fastening force between the rotor core 31 and the shaft 3 can be prevented from decreasing, thereby enabling the rotor core 31 to be properly fixed to the shaft 3.

Although the rotor-shaft-hole-side interior wall surface 62 of the compressor 1 according to the embodiment is formed to follow the curved surface so as to be convex toward the inside diameter side, the rotor-shaft-hole-side interior wall surface 62 may be formed so as not to be convex toward the inside diameter side. In this case, in the compressor 1, the magnet-side interior wall surface 61 is formed so as to be convex toward the inside diameter side, so that the refrigerant passing through the refrigerant holes 36-1 to 36-6 can efficiently cool the permanent magnets 55 provided in the rotor 21.

Although the magnet-side interior wall surface 61 of the compressor 1 according to the embodiment is formed to follow the curved surface so as to be convex toward the inside diameter side, the magnet-side interior wall surface 61 may be formed so as not to be convex toward the inside diameter side. In this case, in the compressor 1, the rotor-shaft-hole-side interior wall surface 62 is formed so as to be convex toward the inside diameter side, so that the region between the refrigerant holes 36-1 to 36-6 and the rotor shaft hole 37 increases in the radial direction, which can increase the strength of the rotor core 31.

Although the compressor part 5 of the compressor 1 according to the embodiment previously described is formed of a rotary compressor, the compressor part 5 may be replaced with another compressor part that is formed of a mechanism different from the rotary compressor. An example of the mechanism includes a scroll compressor.

Although the embodiment has been described, the embodiment is not limited by the content described above. The components described above include those a person skilled in the art could easily conceive of, those that are substantially the same, and those that are within the equivalents. The components described above can also be combined as appropriate. Furthermore, at least one of various omissions, substitutions, and changes may be made to the components without departing from the spirit of the embodiment.

REFERENCE SIGNS LIST 1 compressor
2 container
3 shaft
5 compressor part
6 motor part
21 rotor
22 stator
31 rotor core
36-1 to 36-6 a plurality of refrigerant holes
37 rotor shaft hole
41-1 to 41-6 a plurality of magnet holes
55 a plurality of permanent magnets
56 first magnet
57 second magnet
61 magnet-side interior wall surface
62 rotor-shaft-hole-side interior wall surface
63 first magnet-side interior wall surface portion
64 second magnet-side interior wall surface portion
65 magnet-side intermediate interior wall surface portion
66 first rotor-shaft-hole-side interior wall surface portion
67 second rotor-shaft-hole-side interior wall surface portion
68 rotor-shaft-hole-side intermediate interior wall surface portion

The invention claimed is:

1. A compressor comprising:
a rotor that is fixed to a shaft;
a first core end plate;
a second core end plate;
a stator that causes the rotor to rotate about an axis of rotation;
a compressor part that compresses a refrigerant by the shaft rotating; and
a container that forms an interior space in which the rotor, the stator, and the compressor part are stored, wherein
the rotor has
a rotor core having formed therein an underside rotor end face facing the compressor part, an upper side rotor end face on a side opposite to the side on which the underside rotor end face is formed, an outer circumferential surface facing the stator, a rotor shaft hole through which the shaft passes, a refrigerant hole formed in an axial direction parallel to the axis of rotation allowing the refrigerant to flow therethrough, and a rivet hole,
a first magnet that is embedded in the rotor core, and
a second magnet that is embedded in the rotor core,
the rotor core is formed such that: both ends of the refrigerant hole are respectively formed in the underside rotor end face and the upper side rotor end face; the refrigerant hole does not pass through the rotor shaft hole; and the refrigerant hole does not pass through the outer circumferential surface,
the first magnet is provided in such a manner that one end on a side close to the second magnet is closer to the axis of rotation than another end is,
the second magnet is provided in such a manner that one end on a side close to the first magnet is closer to the axis of rotation than another end is,
the refrigerant hole is disposed between the one end of the first magnet and the axis of rotation, and is disposed between the one end of the second magnet and the axis of rotation,
a magnet-side interior wall surface of an interior wall surface of the refrigerant hole that is formed on a side far from the axis of rotation includes
a first magnet-side interior wall surface portion that is formed on a side close to the first magnet,
a second magnet-side interior wall surface portion that is formed on a side close to the second magnet, and
a magnet-side intermediate interior wall surface portion that is formed between the first magnet-side interior wall surface portion and the second magnet-side interior wall surface portion,
the magnet-side intermediate interior wall surface portion is formed on a side closer to the axis of rotation than the first magnet-side interior wall surface portion and the second magnet-side interior wall surface portion are,
the rivet hole is formed on a side farther from the axis of rotation than the refrigerant hole so that a position of the rivet hole in a circumferential direction does not overlap a position of the refrigerant hole in the circumferential direction,
the first core end plate is disposed in direct contact with the underside rotor end face,
the second core end plate is disposed in direct contact with the upper side rotor end face, and
the magnet-side interior wall surface of the refrigerant hole passes through from the underside rotor end face to the upper side rotor end face in the axial direction.

2. The compressor according to claim 1, wherein
the rotor core has formed therein a magnet hole in which the first magnet and the second magnet are embedded,
the magnet hole is formed in a V shape, and is formed to follow a curved surface so as to be convex toward an inside diameter side,
the magnet hole includes a first magnet hole portion, a second magnet hole portion, and an intermediate hole portion,
the first magnet is embedded in the first magnet hole portion,
the second magnet is embedded in the second magnet hole portion, and
the first magnet hole portion and the second magnet hole portion are connected to each other through the intermediate hole portion.

3. The compressor according to claim 1, wherein
the first magnet-side interior wall surface portion follows the first magnet, and
the second magnet-side interior wall surface portion follows the second magnet.

4. The compressor according to claim 1, wherein
a rotor-shaft-hole-side interior wall surface of an interior wall surface of the refrigerant hole that is formed on a side close to the axis of rotation includes
a first rotor-shaft-hole-side interior wall surface portion that is adjacent to the first magnet-side interior wall surface portion,
a second rotor-shaft-hole-side interior wall surface portion that is adjacent to the second magnet-side interior wall surface portion, and
a rotor-shaft-hole-side intermediate interior wall surface portion that is formed between the first rotor-shaft-hole-side interior wall surface portion and the second rotor-shaft-hole-side interior wall surface portion, and
the rotor-shaft-hole-side intermediate interior wall surface portion is formed on a side closer to the rotor shaft hole than the first rotor-shaft-hole-side interior wall surface portion and the second rotor-shaft-hole-side interior wall surface portion are.

5. A compressor comprising:
a rotor that is fixed to a shaft;
a first core end plate;
a second core end plate;
a stator that causes the rotor to rotate about an axis of rotation;
a compressor part that compresses a refrigerant by the shaft rotating; and
a container that forms an interior space in which the rotor, the stator, and the compressor part are stored, wherein
the rotor has
a rotor core having formed therein an underside rotor end face facing the compressor part, an upper side rotor end face on a side opposite to the side on which the underside rotor end face is formed, an outer circumferential surface facing the stator, a rotor shaft hole through which the shaft passes, a refrigerant hole formed in an axial direction parallel to the axis of rotation allowing the refrigerant to flow therethrough, and a rivet hole,
a first magnet that is embedded in the rotor core, and
a second magnet that is embedded in the rotor core,
the rotor core is formed such that: both ends of the refrigerant hole are respectively formed in the underside rotor end face and the upper side rotor end face; the refrigerant hole does not pass through the rotor shaft hole; and the refrigerant hole does not pass through the outer circumferential surface, the first magnet is provided in such a manner that one end on a side close to the second magnet is closer to the axis of rotation than another end is, the second magnet is provided in such a manner that one end on a side close to the first magnet is closer to the axis of rotation than another end is, the refrigerant hole is disposed between the one end of the first magnet and the axis of rotation, and is disposed between the one end of the second magnet and the axis of rotation, a rotor-shaft-hole-side interior wall surface of an interior wall surface of the refrigerant hole that is formed on a side close to the rotor shaft hole includes
- a first rotor-shaft-hole-side interior wall surface portion,
- a second rotor-shaft-hole-side interior wall surface portion, and
- a rotor-shaft-hole-side intermediate interior wall surface portion that is formed between the first rotor-shaft-hole-side interior wall surface portion and the second rotor-shaft-hole-side interior wall surface portion, the rotor-shaft-hole-side intermediate interior wall surface portion is formed on a side closer to the rotor shaft hole than the first rotor-shaft-hole-side interior wall surface portion and the second rotor-shaft-hole-side interior wall surface portion are, the rivet hole is formed on a side farther from the axis of rotation than the refrigerant hole so that a position of the rivet hole in a circumferential direction does not overlap a position of the refrigerant hole in the circumferential direction, the first core end plate is disposed in direct contact with the underside rotor end face, the second core end plate is disposed in direct contact with the upper side rotor end face, and the rotor-shaft-hole-side interior wall surface of the refrigerant hole passes through from the underside rotor end face to the upper side rotor end face in the axial direction.

* * * * *